United States Patent
Tsunematsu (10) Patent No.: US 8,488,190 B2
(45) Date of Patent: Jul. 16, 2013

(54) IMAGE PROCESSING APPARATUS, IMAGE PROCESSING APPARATUS CONTROL METHOD, AND STORAGE MEDIUM STORING PROGRAM

(75) Inventor: Yuuichi Tsunematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 12/707,620

(22) Filed: Feb. 17, 2010

(65) Prior Publication Data

US 2010/0231995 A1   Sep. 16, 2010

(30) Foreign Application Priority Data

Mar. 11, 2009   (JP) .................................. 2009-058699

(51) Int. Cl.
*H04N 1/60* (2006.01)
*G06K 9/62* (2006.01)

(52) U.S. Cl.
USPC .......... 358/1.9; 358/3.26; 358/3.27; 358/518; 382/224; 382/225; 382/254

(58) Field of Classification Search
USPC ................. 358/1.9, 3.21, 3.24; 382/224, 225, 382/232, 243
See application file for complete search history.

(56) References Cited

U.S. PATENT DOCUMENTS

| 6,529,202 B2 * | 3/2003 | Wu ................................ 345/593 |
| 6,771,813 B1 * | 8/2004 | Katsuyama .................... 382/165 |
| 6,857,114 B2 * | 2/2005 | Doddi ............................ 702/189 |
| 6,922,485 B2 * | 7/2005 | Hirata ............................ 382/164 |
| 6,970,268 B1 * | 11/2005 | Shin et al. ...................... 358/1.9 |
| 6,990,235 B2 * | 1/2006 | Katsuyama .................... 382/173 |
| 7,343,046 B2 * | 3/2008 | Curry et al. .................... 382/243 |
| 7,391,917 B2 | 6/2008 | Ohta et al. |
| 7,623,712 B2 | 11/2009 | Dai et al. |
| 7,903,307 B2 * | 3/2011 | Dai et al. ....................... 358/540 |
| 2009/0097745 A1 * | 4/2009 | Kim et al. ..................... 382/167 |

FOREIGN PATENT DOCUMENTS

| JP | 2004-265384 | 9/2004 |
| JP | 2006-344069 | 12/2006 |

OTHER PUBLICATIONS

"Guide to Image Processing Using C Language", First Edition (ISBN4-7856-3124-1, SHOKODO, 2000) (Partial Translation).

* cited by examiner

*Primary Examiner* — Richard Zhu
(74) *Attorney, Agent, or Firm* — Fitzpatrick, Cella, Harper & Scinto (57) ABSTRACT

An image processing apparatus for processing input image data selects, as a comparative cluster to be compared with a pixel of interest in the input image data, a cluster for which an absolute value of a difference between a component sum of the pixel of interest and a component sum of a representative value of the cluster is not more than a first threshold value. And the apparatus calculates a color distance between the pixel of interest and the representative value of each of the comparative clusters. The apparatus classifies the pixel of interest to a cluster corresponding to a minimum value of the color distances, if the minimum value of the color distances is not more than a second threshold value and generates a new cluster to which the pixel of interest is to be classified, if all the color distances are larger than the second threshold value.

7 Claims, 5 Drawing Sheets

IMAGE PROCESSING APPARATUS, IMAGE PROCESSING APPARATUS CONTROL METHOD, AND STORAGE MEDIUM STORING PROGRAM

BACKGROUND OF THE INVENTION

1. Field of the Invention

The present invention relates to an image processing apparatus, an image processing apparatus control method, and a storage medium storing a program. More particularly, the present invention relates to a scan noise color reduction process using clustering in image processing. In addition, the present invention relates to a method and apparatus for rapidly performing a clustering process by decreasing the number of clusters to be compared when comparing the color distances between a pixel of interest and clusters.

2. Description of the Related Art

Recently, as the digitization of information advances, systems that save paper documents in the form of digital data, instead of directly saving the paper documents, by reading the paper documents with a scanner or the like, and transmit the digital data to another apparatus have become popular. Under the circumstances, digital documents are required to have high compression ratios in order to reduce the costs of saving and transmission of digital data. On the other hand, when giving priority to the convenience for users, digital documents are also required to have high reusability by which objects in digital data can partially be edited, and high image quality that does not deteriorate even when an image is enlarged or reduced.

When document data contains both a character and photograph region, the image quality is high but the compression ratio is low if compression suited to the character region is performed, and the compression ratio is high but the image quality of the character region degrades if compression suited to the photograph region is performed. Therefore, the following method has been proposed (see Japanese Patent Laid-Open No. 2004-265384). In this method, digital data of a document image is separated into a character region and photograph region, the character region required to have high reusability and high image quality is converted into vector data, and the photograph region and the like that cannot simply be reproduced by vectorization is compressed by JPEG. High compressibility, high reusability, and high image quality of the document image are achieved by synthesizing the processing results of the individual regions and outputting the synthetic image.

A method by which not only a character region but also a graphic region (generally called an illustration, clip art, or line drawing) characterized by including several uniform colors and having clear contours is vectorized has also been proposed (see Japanese Patent Laid-Open No. 2006-344069). The method herein proposes inputting an image that reduces the number of colors of the input image by using color similarity. Then, the contour line of each color region is extracted, functional approximation is performed, and vector data is output by adding color information.

When performing vectorization by the method of Japanese Patent Laid-Open No. 2006-344069, a color reduction process is necessary as pre-processing for reducing scan noise contained in an input image and extracting the contours of the original image. As the scan noise color reduction process, a method of performing matching with predetermined representative colors and a method using clustering adopted in Japanese Patent Laid-Open No. 2006-344069 are useful. The matching with representative colors can classify an input image into a few selected colors. However, several representative colors must be predetermined, and there is the possibility that the predetermined representative colors include a color significantly different from the original image. Accordingly, if the number of colors used in the original image and the colors themselves are unknown before processing, the method using clustering is superior to the method using matching in order to reduce colors while accurately maintaining the colors used in the original image.

Although several techniques that achieve clustering are available, it is possible to apply, for example, a known NN (Nearest Neighbor) method. That is, when clustering inputs P1 to Pn, a cluster C1 having P1 as a representative pattern is formed. Then, the distance between Pi ($i \geq 2$) and Cj (j is the number of clusters) is compared with a predetermined threshold value. If the distance between Pi and Cj is smaller than the predetermined threshold value, Pi is made to belong to a cluster having the smallest distance. If there is no cluster having a distance smaller than the threshold value, a new cluster is formed. The algorithm of the NN method executes this processing on all inputs. Details of the NN method are described in, e.g., Agui and Nagao, "Guide to Image Processing Using C Language", the first edition (ISBN4-7856-3124-4, SHOKODO, 2000).

Figure 3A:
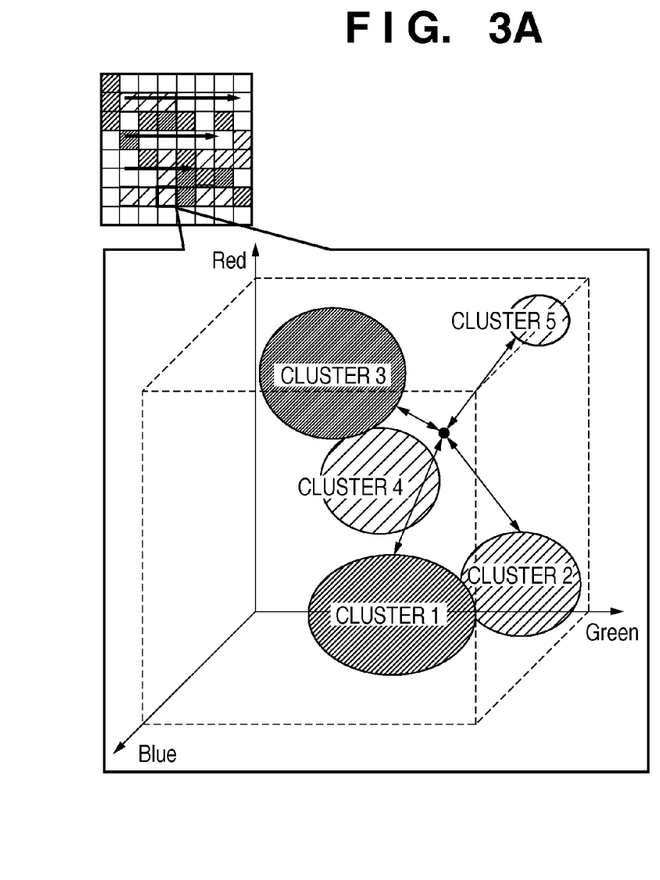
FIG. 3A is a view showing the concept of the process of obtaining the color distances between a pixel of interest and clusters on a three-dimensional space.
Figure 3B:
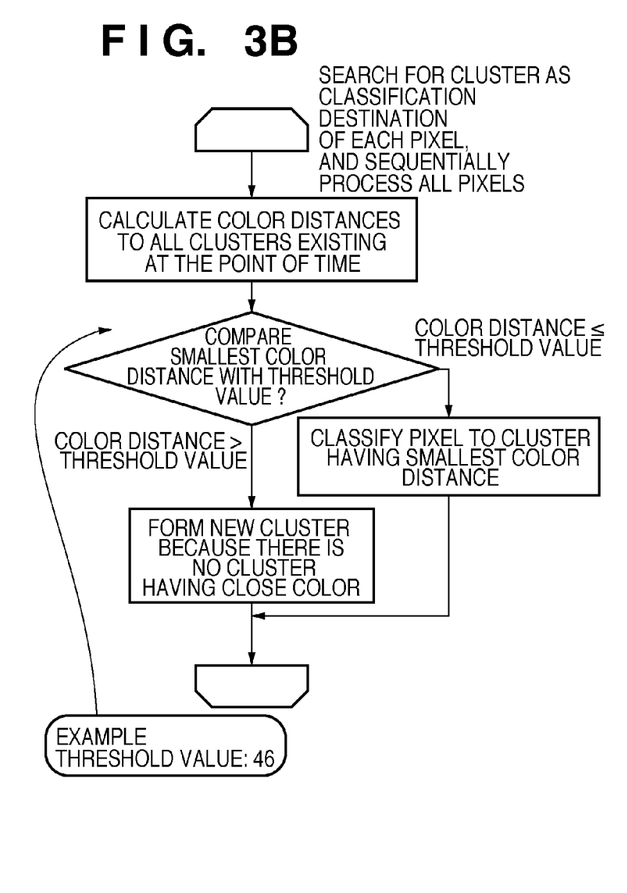
FIG. 3B is a flowchart showing the procedure of the process of obtaining the color distances between a pixel of interest and clusters on a three-dimensional space.

When applying the color reduction process, it is only necessary to use a pixel value (RGB value or luminance value) as an input, and a color distance such as a Manhattan distance (also called a city block distance) or Euclidean distance as a distance. There is, of course, the problem that when the color distance is decreased, the number of clusters to be generated increases, and this prolongs the processing time required for the operation of comparing the pixel value with each cluster. FIG. 3A is an exemplary view of the clustering process. FIG. 3B is a flowchart showing the procedure of the clustering process. When the pixel value is given as a one-dimensional value (e.g., a value within the range of 0 (black) to 255 (white)) such as a value of a black-and-white image, the number of clusters to be compared can be decreased by sorting generated clusters based on the pixel values. When performing clustering on, for example, an RGB color space, however, the color distance is expressed three-dimensionally. This makes it impossible to uniquely specify a cluster having a color distance close to that of a pixel of interest during the comparison. Therefore, a method like this cannot be used. Consequently, it is necessary to obtain the color distances to all generated clusters to search for a cluster having the closest color distance. This prolongs the processing time as the number of clusters increases.

SUMMARY OF THE INVENTION

An aspect of the present invention is to eliminate the above-mentioned problems with the conventional technology.

The present invention provides an image processing apparatus, an image processing apparatus control method, and a program that perform a high-speed color reduction process using clustering.

The present invention in its first aspect provides an image processing apparatus for processing input image data, comprising: a selection unit configured to select, as a comparative cluster to be compared with a pixel of interest in the input image data, a cluster for which an absolute value of a difference between a component sum of the pixel of interest and a component sum of a representative value of the cluster is not more than a first threshold value; a calculation unit configured to calculate a color distance between the pixel of interest and the representative value of each of the comparative clusters selected by the selection unit; a classification unit configured to classify the pixel of interest to a cluster corresponding to a minimum value of the color distances calculated by the calculation unit, if the minimum value of the color distances is not more than a second threshold value; and a generation unit configured to generate a new cluster to which the pixel of interest is to be classified, if all the color distances calculated by the calculation unit are larger than the second threshold value.

The present invention in its second aspect provides a method of controlling an image processing apparatus for processing input image data, comprising the steps of: selecting, as a comparative cluster to be compared with a pixel of interest in the input image data, a cluster for which an absolute value of a difference between a component sum of the pixel of interest and a component sum of a representative value of the cluster is not more than a first threshold value; calculating a color distance between the pixel of interest and the representative value of each of the comparative clusters selected in the selecting step; classifying the pixel of interest to a cluster corresponding to a minimum value of the color distances calculated in the calculating step, if the minimum value of the color distances is not more than a second threshold value; and generating a new cluster to which the pixel of interest is to be classified, if all the color distances calculated in the calculating step are larger than the second threshold value.

The present invention in its third aspect provides a computer-readable storage medium storing a program for causing a computer to execute: selecting, as a comparative cluster to be compared with a pixel of interest in the input image data, a cluster for which an absolute value of a difference between a component sum of the pixel of interest and a component sum of a representative value of the cluster is not more than a first threshold value; calculating a color distance between the pixel of interest and the representative value of each of the selected comparative clusters; classifying the pixel of interest to a cluster corresponding to a minimum value of the calculated color distances, if the minimum value of the color distances is not more than a second threshold value; and generating a new cluster to which the pixel of interest is to be classified, if all the calculated color distances are larger than the second threshold value.

The present invention can minimize the number of objects of the process of obtaining the color distances between a pixel of interest and clusters. Assuming that a threshold value for determining whether to generate a new cluster is given as a first threshold value, the color distance between a pixel of interest and a cluster can be equal to or smaller than the first threshold value only when the absolute value of the difference between the component sum of the pixel of interest and the component sum of the cluster is equal to or smaller than the first threshold value. Consequently, a color reduction process using clustering can rapidly be performed.

In addition, the present invention can increase the speed of the clustering process without changing the processing results by calculating the color distance between a pixel of interest and each cluster by the Manhattan distance.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that like reference numerals designate the same or similar parts throughout the figures, and a description thereof will not be repeated.

<First Embodiment>

An embodiment of the present invention will be explained below with reference to the accompanying drawings. Note that constituent elements described in this embodiment are merely examples, so the technical scope of the present invention is determined by the scope of the appended claims and is not limited by the following individual embodiments.

Figure 2:
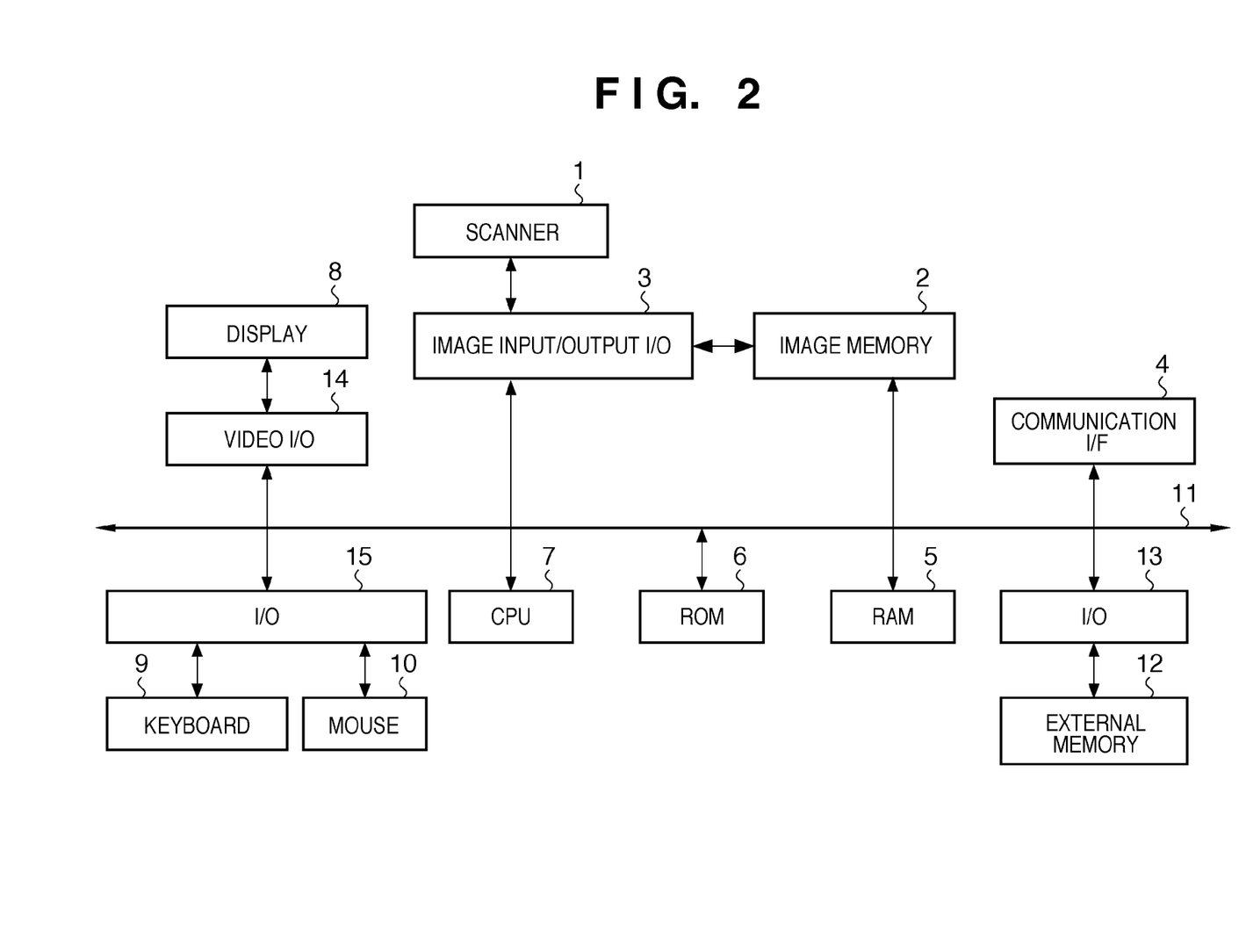
FIG. 2 is a block diagram of the image processing apparatus according to the embodiment.

An example of the arrangement of an image processing apparatus of this embodiment will be explained below with reference to a block diagram of FIG. 2. A CPU 7 is a central processing unit (CPU) for controlling the whole apparatus. A ROM 6 is a read only memory (ROM) for storing programs and parameters requiring no change. A RAM 5 is a random access memory (RAM) for temporarily storing programs and data supplied from an external apparatus or the like. A scanner 1 obtains digital image data by photoelectrically scanning documents and the like. An image input/output I/O 3 is an image input/output interface for connecting the scanner 1 to the image processing apparatus. An image memory 2 stores, e.g., input image data scanned by the scanner 1. An external memory 12 includes, e.g., a fixed hard disk and memory card, removable optical disks such as a flexible disk (FD) and compact disk (CD), and removable cards such as magnetic and optical cards, an IC card, and a memory card. An I/O 13 is an input/output interface for interfacing the external memory 12 with the image processing apparatus. An I/O 15 is an interface for input devices, e.g., a pointing device 10 such as a mouse and a keyboard 9 for receiving user's operations and inputting data. A video I/O 14 is an interface for a display monitor 8 for displaying data held in the image processing apparatus and supplied data. A communication I/F 4 is a network interface for connecting to a network such as the Internet. A system bus 11 connects the units 1 to 15 so that they can communicate with each other.

<Clustering Process>

A procedure of implementing the present invention by a program executed on the CPU 7 will be explained below with reference to a block diagram of FIG. 1 and a flowchart of FIG. 4. When the processing is started in step S1000, image data containing an image region to be processed is input. That is, image data scanned by the scanner 1 is input to the image memory 2 via the image input/output I/O 3. It is also possible to input via the communication I/F 4 an image containing the image region to be processed from outside the apparatus, or read out image data prestored in the external memory 12 via the I/O 13. The obtained input image is held on the image memory 2. Then, the scanned input image data is clustered in step S2000, thereby generating an index image in which the value of each pixel is a cluster number. This process implements a cluster group generator 110 shown in FIG. 1. When the input image is a color image and clustering is performed in the RGB space, each cluster has the pixel values of R, G, and B as values. In step S2100, a component sum (R+G+B) of each cluster is obtained as the reference of sorting, and the clusters are sorted in ascending or descending order. Note that when R, G, or B represents a pixel value in this embodiment, the sum of the values of R, G, and B is used as the component sum. Details of an expression for calculating the component sum will be described later. This process implements a cluster group sorting unit 130 based on the component sum shown in FIG. 1. Note that the component sum of a cluster is the sum of color components of a color as a representative value of the cluster. As a representative value of a cluster, it is possible to use a pixel value to which a newly generated cluster initially belongs. It is also possible to calculate the average value of the components of pixels belonging to a cluster whenever a new pixel is added to the cluster, and use the average value as a representative value. The present invention is, of course, not limited to these methods, and any method can be used. In step S2200, one unprocessed pixel is selected as a pixel of interest from the input image scanned in step S1000, and the component sum of the pixel of interest is calculated. This process implements a pixel-of-interest selector 140 shown in FIG. 1. In step S2300, a comparative cluster for calculating a color distance is selected.

Figure 5:
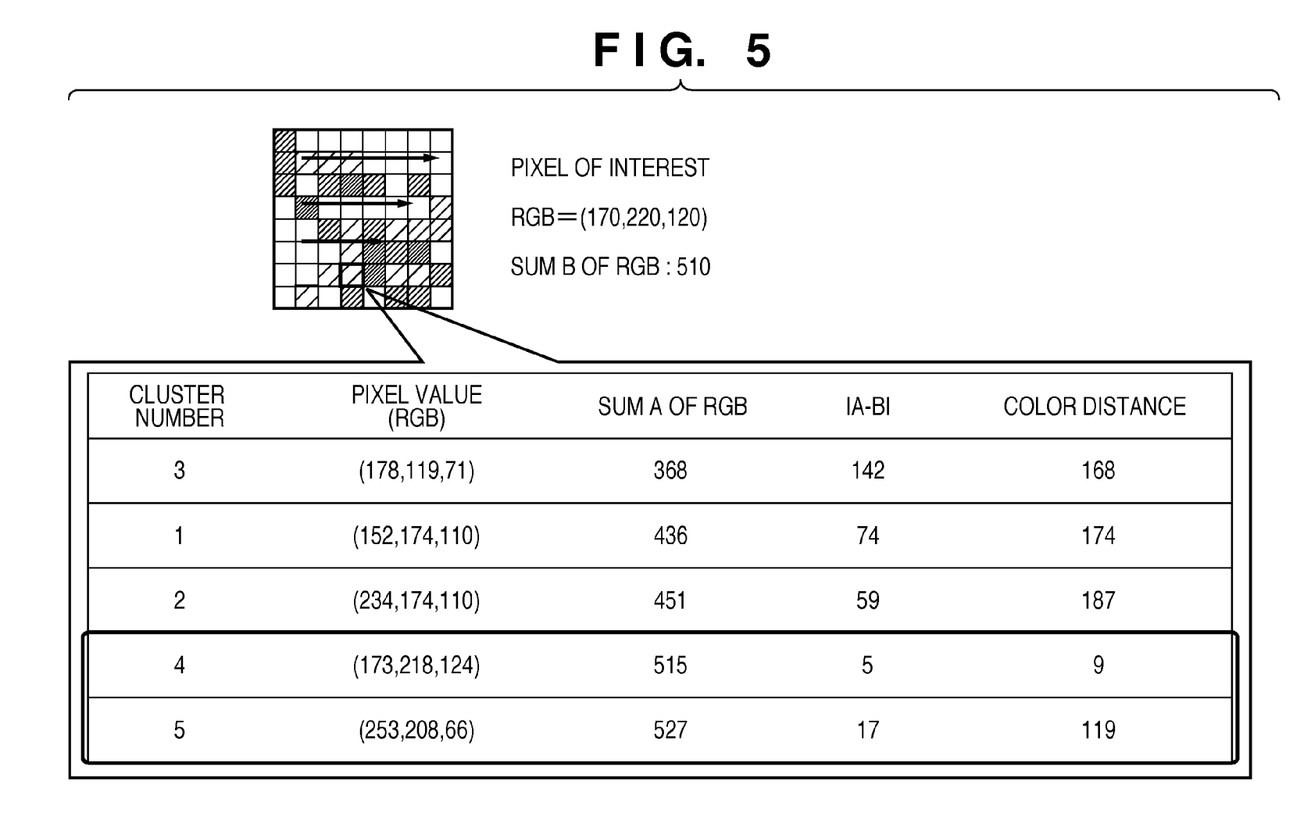
FIG. 5 is a view showing examples of values to be used in sorted clusters and a cluster selecting process.

FIG. 5 shows examples of data held midway along the clustering process, and shows the state in which five clusters are generated and sorted in ascending order based on the component sum of each cluster. Referring to FIG. 5, a comparative cluster is to be selected from the generated clusters for a pixel of interest having RGB=(170, 220, 120) as values. Assume that a first threshold value to be used in determining whether to generate a new cluster is, e.g., 46. When calculating a color distance X between a cluster and the pixel of interest by the Manhattan distance, the following relations always hold for a component sum A of each cluster and a component sum B of the pixel of interest.

Component (RGB) sum A of cluster=R1+G1+B1
Component (RGB) sum B of pixel of interest=R2+G2+B2

Assuming that the color distance (Manhattan distance: X) between a cluster and the pixel of interest=|R1−R2|+|G1−G2|+|B1−B2|, $$|A - B| = |(R1 + G1 + B1) - (R2 + G2 + B2)|$$
$$= |(R1 - R2) + (G1 - G2) + (B1 - B2)|$$
$$\leq |R1 - R2| + |G1 - G2| + |B1 - B2|$$
$$( = X )$$

In the clustering process, the pixel of interest is normally classified to a cluster having the closest color distance. As described above, however, the following relation always holds between the component sum differential value (|A−B| in FIG. 4) and the color distance.

|A−B|≦Color Distance (Manhattan Distance)

Accordingly, to search for a cluster at a color distance equal to or smaller than 46 as the first threshold value, it is sufficient to limitedly perform clustering on clusters for each of which the difference |A−B| between the component sums of the cluster and the pixel of interest is 46 or less. When clusters are sorted, the component sum difference between each cluster and the pixel of interest increases forward or backward in the sorting order from a cluster having the smallest component sum difference.

For example, when a cluster having the smallest component sum difference exists midway along the sorting order, the difference initially monotonically decreases from larger ones in the sorting order and then monotonically increases from a certain point as the boundary. Therefore, a cluster having the smallest component sum difference is first searched for, and only clusters having component sum differences equal to or smaller than the first threshold value are selected by sequentially referring to clusters positioned before and after the first cluster in the sorting order. This makes it possible to efficiently limit a cluster group including clusters having color distances equal to or smaller than the first threshold value. It is, of course, also possible to perform the same processing by sequentially scanning a cluster list from the top of the list, and extract only sections meeting the conditions.

In step S2400, whether one or more clusters are selected as clusters (comparative clusters) as objects of comparison in step S2300 is determined. If there is no selected cluster, a new cluster is generated based on the pixel of interest in step S2500. For example, a new cluster having the pixel value of the pixel of interest as a representative value is generated. If one or more clusters are selected, the color distance (i.e., the distance in the color space) between the pixel of interest and each selected cluster is calculated in step S2600. The color distance calculated in this embodiment is the Manhattan distance described previously.

In step S2700, a cluster having the smallest color distance from the pixel of interest (i.e., a cluster whose color distance has a minimum value) is extracted from the selected clusters, and the calculated color distance is compared with a second threshold value (e.g., 46). If the calculated color distance is equal to or smaller than the second threshold value, the pixel of interest is classified to this cluster (i.e., the cluster whose color distance has a minimum value) in step S2800. This classification of a pixel to a cluster can be performed by forming an attribute map (the above-mentioned index pixel) in which the identifiers of clusters are arranged in relation to pixels, and the relation between each pixel and each cluster can be held. If the color distance is larger than the second threshold value, the process advances to step S2500, and a new cluster is generated based on the pixel of interest. This new cluster is generated by, e.g., defining the identifier and representative value of the new cluster, and saving them. When the process in step S2500 or S2800 is complete, whether the clustering of all pixels in the input image is complete is determined. If it is determined that the clustering process is incomplete, the process returns to step S2100, and the clustering process is repeated by selecting an unprocessed pixel as the next pixel of interest. If it is determined that the clustering of all pixels is complete, the process advances to step S3000. That is, step S2000 as the cluster group generating process is executed on all pixels in the input image.

Note that in the first embodiment, the threshold value (first threshold value) used in step S2300 and the threshold value (second threshold value) used in step S2700 are the same value because the Manhattan distance is used in the color distance calculation. In the above-described example, therefore, the same threshold value (e.g., 46) is used in both steps S2300 and S2700.

Figure 1:
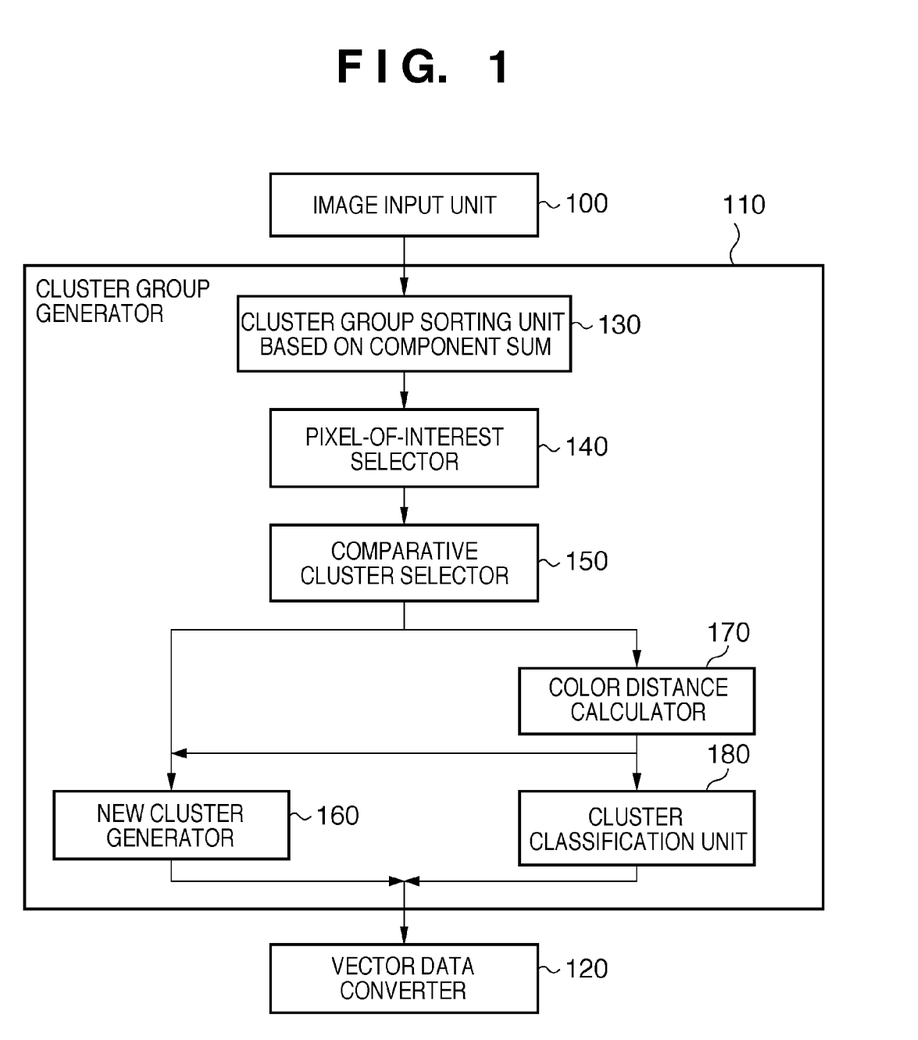
FIG. 1 is a block diagram showing the main processing of an image processing apparatus according to an embodiment.

The processes in steps S2300 and S2400 implement a comparative cluster selector 150 shown in FIG. 1. The process in step S2500 implements a new cluster generator 160 shown in FIG. 1. The processes in steps S2600 and S2700 implement a color distance calculator 170 shown in FIG. 1. The process in step S2800 implements a cluster classification unit 180 shown in FIG. 1. In the above explanation of step S2000, clustering in the RGB space is taken as an example. However, the present invention is not limited to this, and the same effect can also be obtained by using another color space such as HSV or YMCK.

In step S3000, the contour of a pixel mass belonging to each cluster is extracted from a color-reduced image obtained by the clustering process in step S2000, and vectorization is performed for each cluster by performing functional approximation on the contour. As this vectorization process, it is possible to apply, e.g., the method of Japanese Patent Laid-Open No. 2006-344069. A vector data converter 120 performs this process.

The above processing can minimize the number of objects of the process of calculating the color distances between a pixel of interest and clusters. As a consequence, the color reduction process using clustering can rapidly be performed. Although the embodiment according to the present invention has been explained above, many processes of the embodiment are implemented by a computer program executed on the image processing apparatus, so the present invention naturally incorporates this computer program. The computer program is normally stored in the RAM 5, the ROM 6, or a computer-readable storage medium such as a CD-ROM. The computer program can be executed by setting the computer-readable storage medium in a computer, and copying or installing the program in the system. Accordingly, the present invention naturally includes this computer-readable storage medium.

<Second Embodiment>

Figure 4:
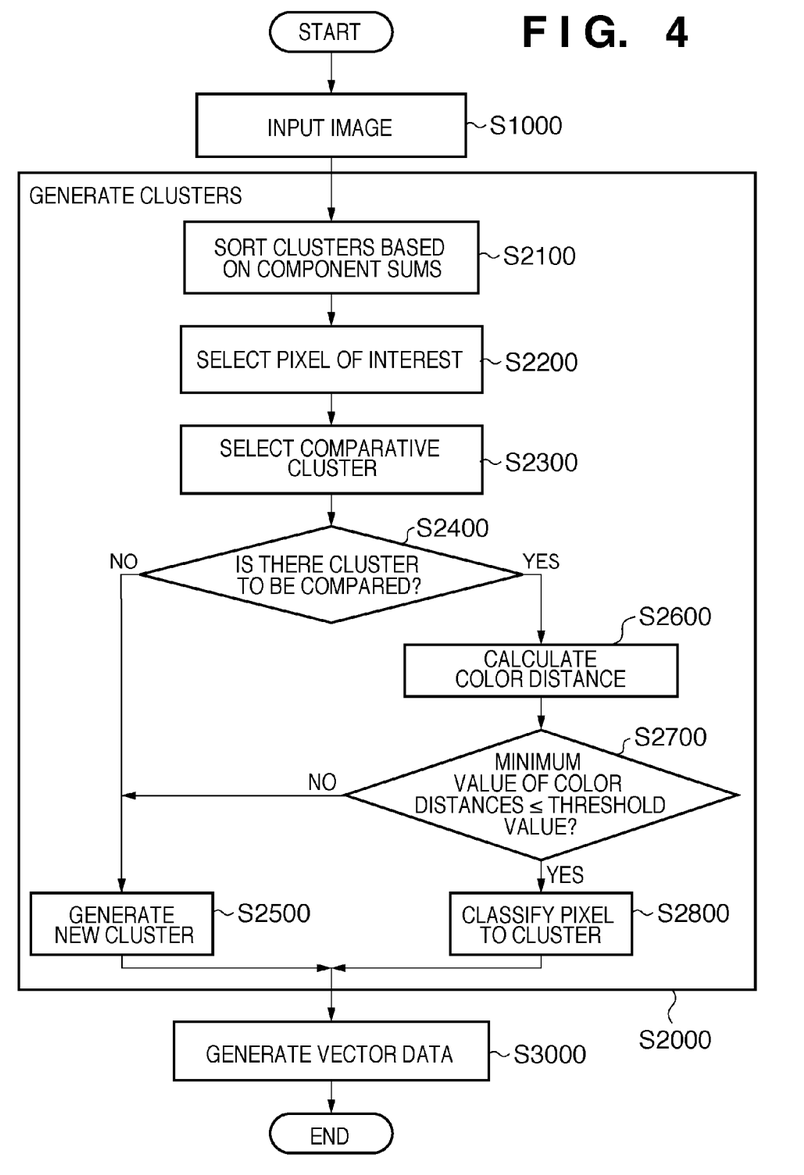
FIG. 4 is a flowchart showing the procedure of the main processing of the image processing apparatus according to the embodiment.

When calculating the color distance in step S2600 of FIG. 4 in the first embodiment, the sum obtained by simply adding the differences of components is used as the color distance. This method poses no problem when the components of R, G, and B are processed under the same conditions. However, clustering may be performed by taking account of, e.g., the brightness of a different condition. For example, Y of the YCbCr color space represents the luminance, and an expression of conversion from RGB is given by $$Y=0.299R+0.587G+0.114B$$

It is also possible to regard this expression as multiplying each component of R, G, and B by a predetermined threshold value as a coefficient. The color distance can also be calculated by thus multiplying each component by the coefficient in advance. In this case, when calculating the component sum to be used in steps S2100 and S2300, the sum of values obtained by multiplying each component by the same predetermined threshold value as that applied to the color distance as a coefficient is processed as the component sum. Consequently, the process can be performed in the same manner as that described in the first embodiment. In this example, the components of R, G, and B are not equally processed but processed by multiplying them by the contribution ratio from the viewpoint of the brightness. Therefore, the present invention is applicable to a system that performs clustering by attaching importance to the brightness. The process can also be performed in the same manner as that described in the first embodiment by normalizing input image data based on a predetermined threshold value (coefficient) beforehand.

The above processing can minimize the number of objects of the process of calculating the color distances between a pixel of interest and clusters. Consequently, the color reduction process using clustering can rapidly be performed.

<Third Embodiment>

The third embodiment uses an index such as the Euclidean distance, other than the Manhattan distance, when calculating the color distance in step S2600 of FIG. 4. In this case, the following relation does not necessarily hold between the color distance (Euclidean distance) and the differential value (|A−B| in FIG. 5) between the linear sums of components.

|A−B|≦Color Distance (Euclidean Distance)

However, the Manhattan distance and Euclidean distance have a correlation to some extent, so it is also possible to narrow comparative clusters by performing the same comparative cluster selecting process as that of the first embodiment in step S2300. That is, after the narrowing process is performed by using the absolute value of the difference between the component sums, the color distance of a comparative cluster is calculated as the Euclidean distance in step S2600.

Note that in the first embodiment, the same value is used as the threshold value for use in the comparative cluster selecting process in step S2300 and the threshold value for use in step S2700 because the Manhattan distance is used as the color distance. On the other hand, the Euclidean distance is used in the color distance calculation in the third embodiment. This makes it desirable to use different values as the threshold value (first threshold value) for use in the comparative cluster selecting process in step S2300 and the threshold value (second threshold value) for use in step S2700.

The above processing can minimize the number of objects of the process of calculating the color distances between a pixel of interest and clusters. As a consequence, the color reduction process using clustering can rapidly be performed.

<Other Embodiment>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-058699, filed Mar. 11, 2009, which is hereby incorporated by reference herein in its entirety.

What is claimed is:

1. An image processing apparatus for processing input image data, comprising:

a selection unit configured to select, as comparative clusters to be compared with a pixel of interest in the input image data, clusters for which an absolute value of a difference between a component sum of the pixel of interest and a component sum of a representative value of each of the clusters is not more than a first threshold value;

a calculation unit configured to calculate color distances between the pixel of interest and the representative value of each of the comparative clusters selected by said selection unit;

a classification unit configured to classify the pixel of interest to a cluster corresponding to a minimum value of the color distances calculated by said calculation unit, if the minimum value of the color distances is not more than a second threshold value; and a generation unit configured to generate a new cluster to which the pixel of interest is to be classified, if all the color distances calculated by said calculation unit are larger than the second threshold value.

2. The apparatus according to claim 1, further comprising a sorting unit configured to sort generated clusters based on the component sums, wherein said selection unit processes the clusters sorted by said sorting unit.

3. The apparatus according to claim 1, wherein the color distance calculated by said calculation unit is a Manhattan distance, and the first threshold value and the second threshold value are the same value.

4. The apparatus according to claim 1, wherein the color distance calculated by said calculation unit is a Euclidean distance, and the first threshold value and the second threshold value are different values.

5. The apparatus according to claim 1, further comprising a conversion unit configured to vectorize the input image data for each cluster.

6. A method of controlling an image processing apparatus for processing input image data, comprising the steps of:

selecting, as comparative clusters to be compared with a pixel of interest in the input image data, clusters for which an absolute value of a difference between a component sum of the pixel of interest and a component sum of a representative value of each of the clusters is not more than a first threshold value;

calculating color distances between the pixel of interest and the representative value of each of the comparative clusters selected in the selecting step;

classifying the pixel of interest to a cluster corresponding to a minimum value of the color distances calculated in the calculating step, if the minimum value of the color distances is not more than a second threshold value; and generating a new cluster to which the pixel of interest is to be classified, if all the color distances calculated in the calculating step are larger than the second threshold value.

7. A non-transitory computer-readable storage medium storing a program for causing a computer to execute:

selecting, as comparative clusters to be compared with a pixel of interest in the input image data, clusters for which an absolute value of a difference between a component sum of the pixel of interest and a component sum of a representative value of each of the clusters is not more than a first threshold value;

calculating color distances between the pixel of interest and the representative value of each of the selected comparative clusters;

classifying the pixel of interest to a cluster corresponding to a minimum value of the calculated color distances, if the minimum value of the color distances is not more than a second threshold value; and generating a new cluster to which the pixel of interest is to be classified, if all the calculated color distances are larger than the second threshold value.

* * * * *